United States Patent [19]

Shumaker

[11] 3,782,884
[45] Jan. 1, 1974

[54] ACID GAS BURNER

[75] Inventor: Willis L. Shumaker, Independence, Mo.

[73] Assignee: Standard Oil Company, Chicago, Ill.

[22] Filed: May 9, 1972

[21] Appl. No.: 251,660

[52] U.S. Cl............. 431/186, 239/417.3, 239/424, 239/456, 431/187
[51] Int. Cl. ............................................. F23c 5/06
[58] Field of Search.................... 431/171, 186, 187, 431/188, 189; 239/417.3, 424, 456, 460

[56] References Cited
UNITED STATES PATENTS

| | | | |
|---|---|---|---|
| 1,563,246 | 11/1925 | Zulver | 431/171 |
| 2,914,257 | 11/1959 | Wiant | 239/460 |
| 1,996,545 | 4/1935 | Knowlton | 239/460 |
| 823,836 | 6/1906 | Wiemann | 431/186 |
| 3,123,127 | 3/1964 | Willott | 431/186 |
| 1,779,647 | 10/1930 | Van Brunt | 431/186 |

Primary Examiner—Carroll B. Dority, Jr.
Attorney—Claron N. White et al.

[57] ABSTRACT

A burner for feeding acid ($H_2S$) gas to a combustion chamber of a thermal reactor contains a gas-feeding tube having a forward flared open end, that extends horizontally through a wall of the reactor into the chamber, and a gas diverter concentrically disposed in that open end to provide an annular space between the diverter and the flared open end of the tube. The diverter has a rearward portion with a frustoconical surface facing the inner surface of that flared end of the tube. The diverter is connected at its rear end, inside the tube, to one end of a shaft that extends rearwardly through the tube to an external location for its other end. The shaft adjacent that other end is connected to means to move the shaft longitudinally for adjustment of the dimension of the annular space between the diverter and the flared end of the tube. The burner further includes an intermediate support for the movable shaft. The intermediate support is mounted on the tube adjacent its flared end. The shaft is also supported adjacent its other end.

9 Claims, 4 Drawing Figures

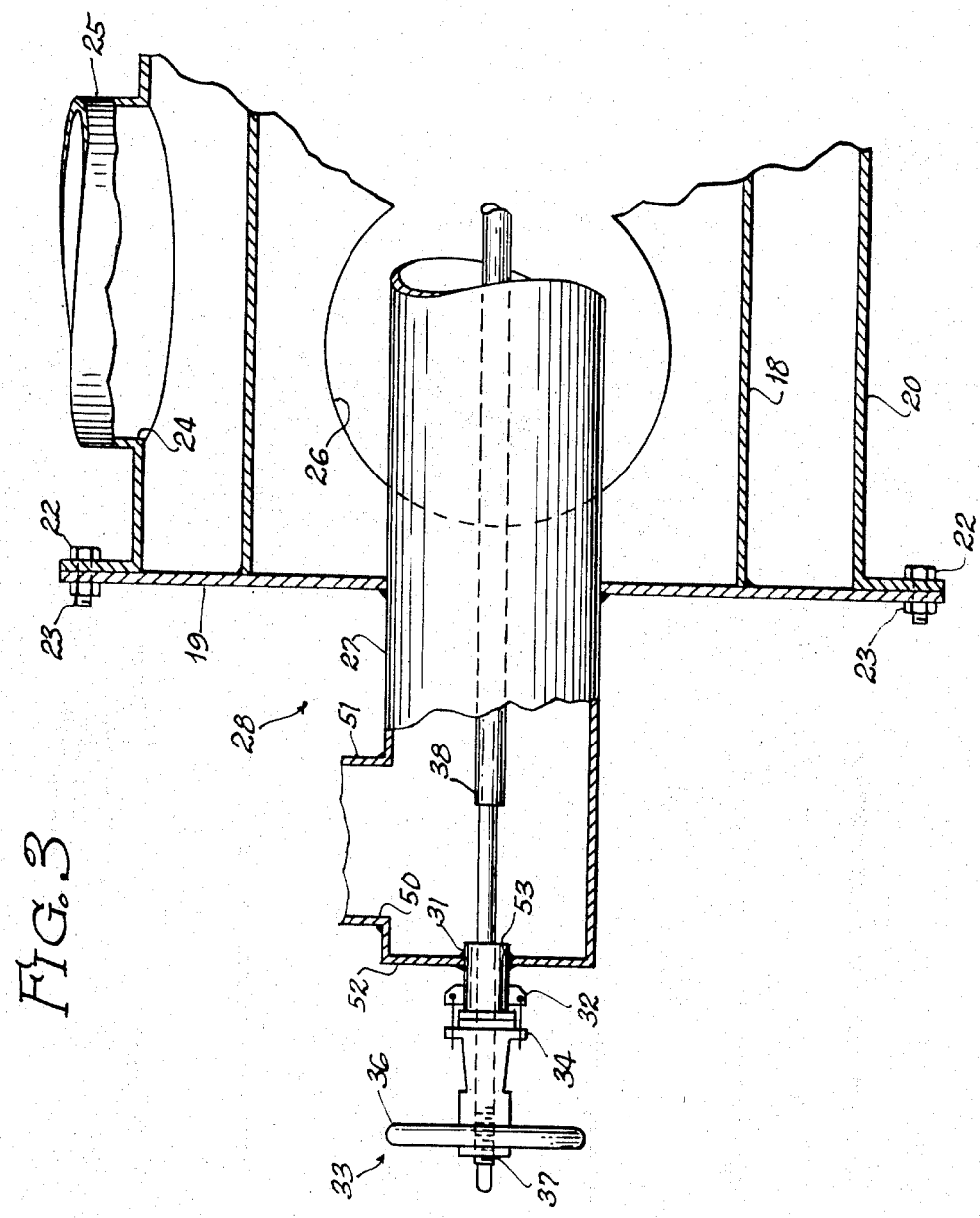

ACID GAS BURNER

BACKGROUND OF THE INVENTION

1. Field of the Invention

This invention relates to an acid gas burner for a thermal reactor of a sulfur plant i.e., a plant for the recovery of sulfur from hydrogen sulfide. The gas containing hydrogen sulfide is fed by the burner to a combustion chamber of a thermal reactor where hydrogen sulfide is burned by oxygen in air to form sulfur dioxide. Conventionally, one-third of the volume of hydrogen sulfide is thus converted. The combustion product gas is cooled and then passed through a catalytic reactor, in which the formed sulfur dioxide reacts with hydrogen sulfide remaining to form elemental sulfur, that is then condensed and separated from the gas.

2. Description of the Prior Art

The recovery of elemental sulfur as a by-product from various processes is described at pages 352–354 of volume 19 of *Kirk-Othmer Encyclopedia of Chemical Technology*, second completely revised edition, published by Interscience Publishers, a division of John Wiley & Sons, Inc., New York, N.Y. In that description it is stated that in sour natural gas sulfur is present as hydrogen sulfide. It is also stated that in petroleum refining gases are obtained that contain hydrogen sulfide. In either case, the hydrogen sulfide is removed by absorption in a solution of alkanolamine, which upon heating gives up its hydrogen sulfide in concentrated form. The description includes a generalized flowsheet for this separation of hydrogen sulfide and the subsequent treatment to form elemental sulfur. Descriptions of processes for this supplemental treatment are presented in the articles entitled "Package plants for sulfur recovery," *Chemical Engineering Progress*, (Vol. 61, No. 9) September 1965, at pages 70–73 and "Watch these trends in Sulfur plant design," *Hydrocarbon Processing*, March 1972, at pages 105–108. Apparatuses for the treatment processes for sulfur recovery from $H_2S$-containing gas are disclosed and claimed in U. S. Pat. Nos. 2,889,207 and 2,939,769.

As seen in U. S. Pat. No. 2,889,207, the gas rich in hydrogen sulfide is burned with air in a furnace, i.e., a thermal reactor in which the temperature may range as high as 2,000° to 2,500° F. This gas leaves the furnace and enters a waste heat boiler to cool the gas to 400°–600° F. before passage into a catalytic converter. In the other patent mentioned above the apparatus is constructed so that the furnace is integral with the boiler as part of a highly efficient and compact sulfur recovery plant.

A burner, commonly known as an acid gas burner, is used to feed the $H_2S$-rich gas to the combustion chamber where it mixes with and reacts with air. An acid gas burner used prior to the present invention comprises a tube or pipe having one end extending into the combustion chamber with a bulbous cap mounted on the end and having its convex surface facing the chamber. The cap has concentric sets of holes through it to provide diverging streams of flow of the gas from the tube into the combustion chamber. The cap has a central recess in which is located heat-insulating material. Part of the $H_2S$ content of the gas that is passed through these concentric sets of holes is burned primarily to $SO_2$. This burner is mounted in a side wall of the reactor and extends through and is concentric with a larger tube or pipe into which is fed air from a blower. The air passes into the chamber through an annular space between the burner tube and the larger pipe. The mixing of air and acid gas adjacent the cap or burner tip and the high reaction temperature obtained causes build-up of iron sulfide scale, due to the corrosive nature of $H_2S$, and causes deformation of the burner tip, resulting in high pressure drop and back pressure. This restricted the throughout of the acid gas so that burning part of it in the atmosphere, commonly called flaring, was necessary. The high back pressure undesirably caused a higher amine stripper pressure and this necessitated the use of a higher reboiler temperature.

A recently developed acid gas burner avoided the construction of an end cap with its set of holes that undesirably can decrease in size with use, as mentioned above. That burner has its tube flared at the end extending into the combustion chamber. Rigidly mounted on the tube in that open end is a diverter concentrically disposed. The diverter comprises a cone-shaped metal sheet connected at its outer surface adjacent its edge to the flared portion of the burner tube by a number of equally spaced radial metal webs, as a fixed spider support arrangement. This construction provides basically an annular passage for the gas from the pipe to the combustion chamber. The concave side of the conical sheet faces outwardly, i.e., toward the combustion chamber and that side of the sheet contains a lining of heat-insulating refractory cast in place and containing embedded in it a number of wires connected to the metal sheet to secure the refractory to the conical sheet. The refractory protects the metal sheet to some extent from the high temperature in the combustion furnace, but the corrosion of the metal remains so that there still is the problem of decrease of size of the annular passage during use of the burner.

The sulfur plant in a petroleum refinery can receive feed from several units. Also there is a variation in the sulfur content of crude oils used in a refinery. These factors result in a wide range of flow of acid gas and in a wide range of burner pressure. There can be as much as a fivefold variation in flow of acid gas to be treated. The burners of the prior art that have been mentioned above are not capable of compensating for such variations or change in passage area with use, although as regarding the change in area the later developed burner of the prior art is a substantial improvement over the previous construction, those burners do not permit compensation for such variations to provide a uniform flame pattern in the combustion chamber. They lack the ability to avoid excessive back pressure from either fouling or high flow.

SUMMARY OF THE INVENTION

This invention relates to an acid gas burner useful for feeding to a combustion chamber of a thermal reactor a gas containing $H_2S$ for the oxidation of a part of the $H_2S$ to $SO_2$ by air also fed to the chamber. The burner comprises a tube with a flared open end for feeding the acid gas to the chamber. In use the tube extends into the chamber through a larger tube with which it is concentrically disposed to provide an annular passage of air between the two tubes into the chamber. The larger tube is mounted at an opening in the side wall of the combustion chamber. The burner also includes a diverter concentrically disposed at that open end of the tube. The rearward portion of the diverter has a frustoconical surface facing the inner surface of that flared end of the tube so as to provide an annular space between them. To this extent the burner of the present invention has a construction similar to the recently developed gas burner mentioned above. However, instead of the diverter being rigidly mounted on the tube at its flared open end, the burner of the present invention has the diverter connected to a shaft for its support, and the shaft extends rearwardly through the tube to an external location for its other end. The burner further includes means to move the shaft longitudinally for movement of the diverter relative to the tube for adjusting the change in the dimensions of the annular passage between the diverter and the flared open end of the tube. The burner of this invention also includes means to support the shaft adjacent its other end and means to support the shaft adjacent its end on which is mounted the diverter.

Due to this construction, the burner of the present invention can compensate for any change in passage area due to scale build-up and can be adjusted to provide a uniform flame pattern and to avoid excessive back pressure resulting from substantial change in flow of acid gas to the tube of the burner. As seen below, the diverter can be constructed entirely of refractory material and thus, except for the flared end of the tube, can avoid the scale formation that occurs with the burner, mentioned above, that required the conical metal sheet for rigidly connecting the diverter by metal webs, i.e., radial metal plates, to the tube for annular flow of acid gas to the combustion chamber.

The burner of the present invention has another advantage due to its adjustability of the area of the annular passage by movement of the diverter through longitudinal, i.e., axial movement of the shaft. The movement can be controlled automatically by means responsive to change in rate of flow of acid gas to the burner.

DESCRIPTION OF THE DRAWINGS

Preferred embodiments of the burner of the present invention are illustrated in the drawings in which generally similar parts are identified by the same numerals and in which:

FIG. 3 is a fragmentary view of the thermal reactor showing an alternative construction for the burner when its tube for feeding gas does not have a curved construction external of the reactor but rather is straight throughout and has a side opening, adjacent its closed and external of the reactor, for connection to a feed pipe that provides it with acid gas.

FIG. 4 is a fragmentary view of the burner showing another embodiment of construction for the diverter of the burner.

DETAILED DESCRIPTION

Figures 1, 2:
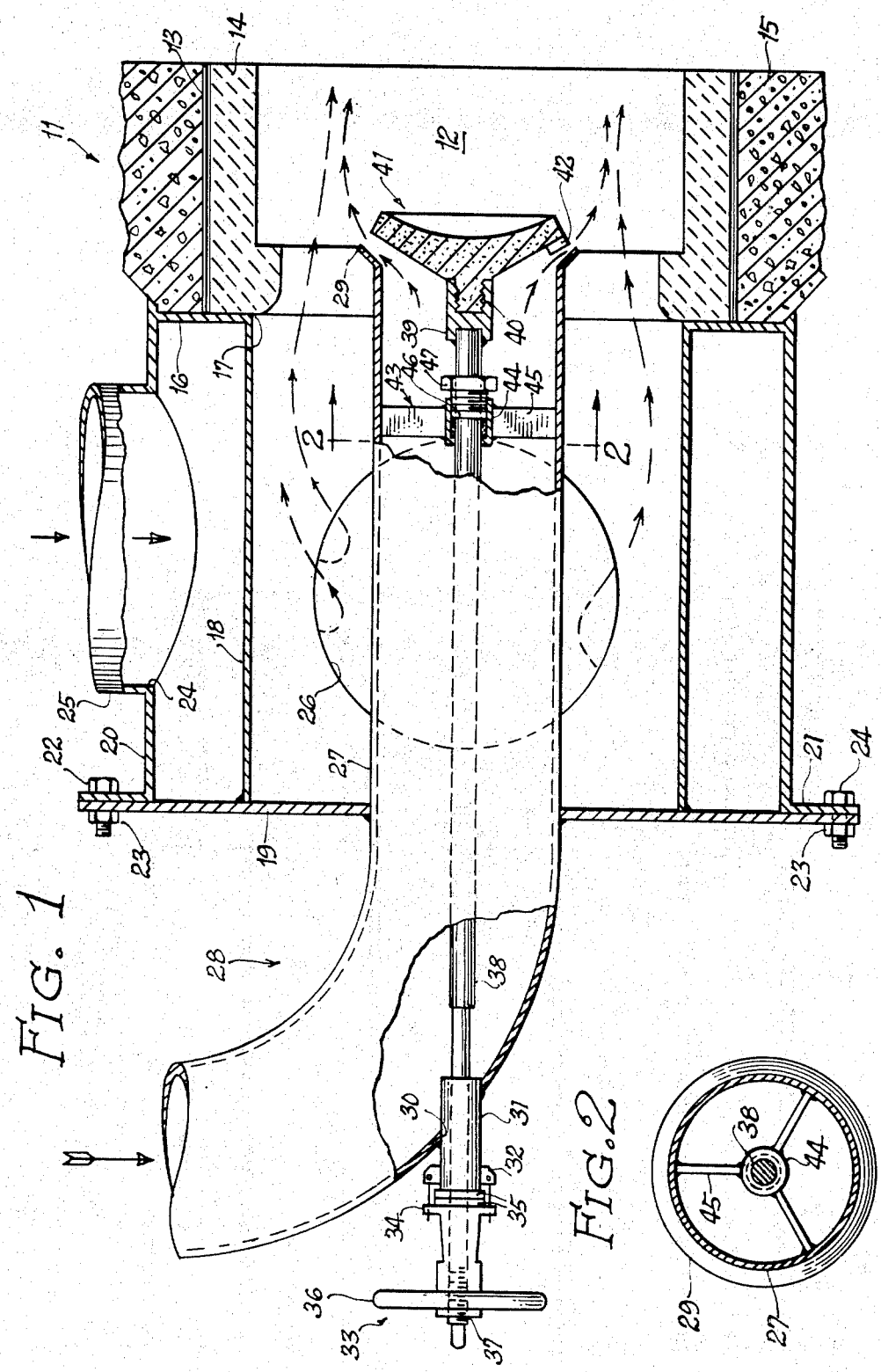
FIG. 1 is a fragmentary longitudinal section of a thermal reactor of a sulfur plant showing mounted in position an especially preferred embodiment of the acid gas burner of the present invention.
FIG. 2 is a cross-section taken along the line 2—2 of FIG. 1.

FIG. 1 shows a thermal reactor generally indicated at 11 containing a combustion chamber 12 enclosed by a housing 13 internally lined with a refractory 14 and having a heat insulating jacket 15. The housing 13 is enclosed at one end by a circular end plate 16 having an opening 17. The refractory lining 14 has an opening aligned with opening 17 of plate 16. This construction provides an inlet opening for chamber 12.

A large pipe 18 is mounted on plate 16 so that one end of pipe 18 is at opening 17 of plate 16. The other end of pipe 18 is closed by a plate 19. A larger pipe 20 is concentric with pipe 18. One end of pipe 20 is fit over plate 16. The other end of pipe 20 has a flange 21 that is bolted to plate 19 by bolts 22 and nuts 23. The pipe 20 has an opening 24 at which a pipe 25 is connected to pipe 20. The pipe 25 is connected to an air blower (not shown) that feeds air by pipe 25 to the annular space between pipes 18 and 20. The pipe 18 has two large oval openings 26 facing each other and disposed 90° relative to opening 24 in pipe 20. By openings 26 air received in the annular space between pipes 18 and 20 passes into pipe 18 and then passes from it through the opening 17 of plate 16 into chamber 12.

Concentrically disposed within pipe 18 is the forward end of a tube 27 of one embodiment of the acid gas burner of the present invention and generally indicated at 28. That forward portion of tube 27 extends through opening 17 to chamber 12 and has a flared open end 29. With this construction of the forward end of the tube 27 and its disposition in tube 18, air in pipe 18 travels to chamber 12 in an annular path from the time it passes through the opening 17 of plate 16.

Disposed in pipe 18 around this forward end portion of tube 27, equidistant from it and extending into chamber 12 is a parallel set of pilot burners (not shown) that have their tips directed toward the longitudinal axis of pipe 18 and that are conventionally supported by and communicating with a plenum ring (not shown) communicating with a pipe (not shown) extending through plate 19 and connected to a fuel gas supply (not shown). Also in pipe 18 is an igniter assembly (not shown) that extends through plate 19, through opening 17 of plate 16 and into chamber 12. The igniter assembly has its own feed pipes for gas and air. That assembly is used to provide initial combustion to light the pilot burners that are used only during start-up of thermal reactor 11. Of course, the igniter assembly and the set of pilot burners are external of tube 27 and extend through the annular space between it and opening 17 of plate 16. The use of the igniter assembly and the pilot burners is conventional with the earlier acid gas burners of the prior art mentioned above.

The acid gas burner 28 has its tube 27, in the embodiment shown in FIG. 1, constructed with a curved rearward portion that is external of the housing provided by pipe 18 and plate 19. This curved portion of pipe 27 has an opening 30 in alignment with the longitudinal axis of the straight forward portion of tube 27 that is within pipe 18 and extends into chamber 12. A cylindrical sleeve 31 extends through opening 30 and is welded to that wall of pipe 27. The longitudinal axis of sleeve 31 is in alignment with the longitudinal axis of the straight forward portion of tube 27. The sleeve 31 has a flange 32 at its external end. The top part of an outside-screw and yoke type gate valve, generally indicated at 33, is mounted on this external end of sleeve 31 with that top part of gate valve 33 having its bottom flange 34 connected conventionally by nuts and bolts to flange 32 of sleeve 31. The sleeve 31 and flange 34 are separated by two annular packing rings 35.

The top part of gate valve 33 has a hand wheel 36 that operatively engages the threaded end of a stem 37 that extends through sleeve 31 into tube 27 where the other end of stem 37 is connected to a tubular shaft 38. Mounted on the other end of tubular shaft 38 is a coupling 39 that has at its other end a threaded hole in which is mounted a threaded rearward cylindrical extension 40 of a diverter generally indicated at 41 made entirely of a suitable refractory material that is resistant to the high temperature it will reach due to combustion in chamber 12 and that is resistant to corrosion by the acid gas. Such material is a silicon nitride-bonded silicon carbide refractory, such as "Refrax."

As seen in FIG. 1, the forward face of diverter 41 is dished but it may be flat. The rearward portion of diverter 41 has a shape such that its surface is frustoconical. The extension 40 of diverter 41 extends rearwardly from the smaller dimension of this frustoconical surface. The forward portion of the frustoconical surface faces the inner surface of flared end 29 of tube 27. This forward portion of the frustoconical surface of diverter 41 has a number of bosses 42, such as three of them equally spaced about the periphery of this surface, to abut the inner surface of flared end 29 if diverter 40 is moved to the left (as viewed in FIG. 1) a sufficient distance. This construction by preventing a further movement of diverter 41 to the left by wheel 36 prevents closing of the annular passage between diverter 41 and flanged end 29 of pipe 27.

Adjacent the forward end of tubular shaft 38, i.e., adjacent diverter 41, tubular shaft 38 is provided with an intermediate support by a spider support generally indicated at 43. The support 43 comprises a sleeve 44 with an inwardly turned flange at one end and that is internally threaded at the other end to serve as a gland housing. The support 43 has radial plates 45 welded to sleeve 44 and to the inside surface of tube 27. Between sleeve 47 and tubular shaft 38 there is packed a gasket-type, heat-resistant material enclosed in Monel mesh. A gland ring 46 is forced against the gasket and kept in position by a gland nut 47 that has its external threads engaging the internal threads of sleeve 44. This construction provides support of tubular shaft 38 so as to prevent vibration at its forward end and thus prevent vibration of diverter 41. The latter vibration would be undesirable because it would change the nature of the annulus between diverter 41 and flared end 29 of tube 27. At the same time this construction permits axial movement of shaft 38 and thus axial movement of diverter 41 while maintaining this concentric disposition of diverter 41 with respect to the forward portion of tube 27.

In view of the foregoing description it is seen that coupling 39, shaft 38 and stem 37 provide the shaft for the support of diverter 41 and that this shaft is supported at its rear end portion by support means constituting a top part of gate valve 33 that, at the same time, is supported by sleeve 31 mounted on and supported by tube 27 at its curved external portion. It is also seen that the shaft that provides this support of diverter 41 has intermediate support means adjacent to diverter 41 by virtue of presence of spider support 43 that is fixedly mounted within the forward portion of tube 27, while permitting axial movement of the shaft that supports diverter 41 for its axial movement with respect to tube 27.

It is seen further that the top part of gate valve 33 in combination with its support sleeve 31, fixedly mounted on tube 27, constitutes means to move the shaft longitudinally and thus to move diverter 41 mounted on its other end in either direction along the longitudinal axis of the forward portion of tube 27.

Referring to FIG. 3, there are several differences of construction of burner 28. These differences are present because tube 27 external of pipe 18 and plate 19 is straight rather than curved. As a result, tube 27 has an opening 50 through which it receives acid gas from a pipe 51 connected to pipe 27 at that point. The pipe 25, as in the construction shown in FIG. 1, is connected to the air blower. The rearward end of pipe 27 is closed by a plate 52 having a central opening 53 through which extends sleeve 31 that is secured to plate 52.

Referring to FIG. 4, the diverter 41 has a different construction than that shown in FIG. 1 in that diverter 41 of FIG. 4 is not made of one material but has a composite construction. The unitary diverter 41 of FIG. 4 includes a conical metal sheet 54 on the outside surface of which are mounted metal bosses 42 for the purpose indicated above with respect to refractory bosses 42 of diverter 41 shown in FIG. 1. Of course, the conical sheet 54 has an outer frustoconical surface facing the flared end of tube 27. The sheet 54 is welded to gussets 55 that are welded to the forward end of tubular shaft 38. A number of bent wires 56 are attached to the front face of sheet 54 and have embedded in a cast heat-resistant, heat-insulating refractory 57 that is on the forward face of plate 54. The refractory 57 has a sufficient thickness at the margin of conical plate 54 to avoid excessive heating of plate 54. The front face of refractory 57 is dished to minimize the greater thickness of refractory 57 forward of the central portion of plate 54.

The frustoconical surface portion of diverter 41 of the burner of the invention preferably has an included angle that is larger than that of the inner surface of the flared end of tube 27. This provides the advantage of a smaller longitudinal movement of the diverter to provide a given change in the area of the annular space between the diverter and the tube.

The foregoing has presented preferred embodiments of the burner of the present invention. Many variations will be obvious to one skilled in the art in view of the foregoing description and the drawings. The embodiments have been presented solely for the purpose of illustration and not for the purpose of limitation of the invention that is limited only by the claims that follow.

I claim:

1. An acid gas burner for feeding $H_2S$-containing gas to a combustion chamber of a thermal reactor of a sulfur plant, said burner including:

a gas-feeding tube having a forward cylindrical portion, that in use extends horizontally within, coaxial with and spaced from the forward cylindrical portion of an air-supply tube and through a wall of the reactor into the chamber and that has a flared open end;

a gas diverter concentrically disposed in that open end to provide an annular space between said diverter and said open end of said gas-feeding tube, said diverter having a rearward portion with a frustoconical surface having its outer margin facing the inner surface of that flared end of said gas-feeding tube at the annular space for diverging forward outflow of acid gas from the gas-feeding tube;

a shaft connected to the rear end of said diverter and extending rearwardly through the gas-feeding tube to an external location for the other end of said shaft, said shaft being concentrically disposed with respect to the forward portion of said gas-feeding tube;

means adjacent said other end of said shaft to support said shaft;

means within the forward portion of said gas-feeding tube and adjacent said diverter to provide an intermediate support for said shaft, said intermediate support means being supported by said forward portion of said gas-feeding tube and being constructed to permit relative movement of said shaft with respect to said support means;

means mounted on said gas-feeding tube and operatively associated with said shaft adjacent said other end of said shaft to move and position said shaft along its longitudinal axis for adjustment of the width of the annular space between said diverter and said flared open end of said gas-feeding tube; and means mounted on the burner to limit rearward axial movement of said diverter by said shaft to prevent closing of said annular space.

2. The burner of claim 1 wherein said diverter has bosses on said outer margin of said frustoconical surface facing said open end of said gas-feeding tube to constitute said means to limit the rearward axial movement of said diverter.

3. The burner of claim 2 wherein said diverter is a one-piece refractory member that is resistant to corrosion by the acid gas and is heat-resistant.

4. The burner of claim 3 wherein said diverter is a silicon nitride-bonded silicon carbide refractory and wherein said diverter has a rearward threaded cylindrical extension from said portion having said frustoconical surface, said burner further including means to couple said extension to the forward end of said shaft.

5. The burner of claim 2 wherein said diverter comprises:

a conical metal sheet;

gussets connected to said shaft and to said conical sheet to connect said sheet to said shaft; and a cast refractory secured to the entire forward face of said conical metal sheet, said refractory having a dished front face, and wherein said bosses are metal and are connected to the rear frustoconical surface of said sheet at its margin.

6. An acid gas burner for feeding $H_2S$-containing gas to a combustion chamber of a thermal reactor, said burner including:

a gas-feeding tube having a forward cylindrical portion, that in use extends horizontally through a wall of the reactor into the chamber and has a flared open end;

a gas diverter concentrically disposed in that open end to provide an annular space between said diverter and said flared open end of said tube, said diverter having a rearward portion with a frustoconical surface having its outer margin facing the inner surface of that flared open end of said tube at the annular space for diverging forward outflow of acid gas from the tube;

a shaft connected to the rear end of said diverter and extending rearwardly through the tube to an external location for the other end of said shaft, said shaft being concentrically disposed with respect to the forward portion of said tube;

means adjacent said other end of said shaft to support said shaft;

means within the forward portion of said tube and adjacent said diverter to provide an intermediate support for said shaft, said intermediate support means being supported by said forward portion of said tube and being constructed to permit relative axial movement of said shaft with respect to that support means;

means adjacent said other end of said shaft to move said shaft longitudinally for axial movement of said diverter relative to said flared open end of said tube; and bosses on said outer margin of said frustoconical surface facing said flared open end of said tube to limit the rearward axial movement of said diverter by said shaft-moving means to prevent closing said annular space, said diverter being a one-piece member of silicon nitride-bonded silicon carbide refractory and having a rearward threaded cylindrical extension from said portion having said frustoconical surface, and said burner further including means to couple said extension to the forward end of said shaft.

7. An acid gas burner for feeding $H_2S$-containing gas to a combustion chamber of a thermal reactor, said burner including:

a gas-feeding tube having a forward cylindrical portion, that in use extends horizontally through a wall of the reactor into the chamber and has a flared open end;

a gas diverter concentrically disposed in that open end to provide an annular space between said diverter and said flared open end of said tube, said diverter having a rearward portion with a frustoconical surface having its outer margin facing the inner surface of that flared open end of said tube at the annular space for diverging forward outflow of acid gas from the tube;

a shaft connected to the rear end of said diverter and extending rearwardly through the tube to an external location for the other end of said shaft, said shaft being concentrically disposed with respect to the forward portion of said tube;

means adjacent said other end of said shaft to support said shaft;

means within the forward portion of said tube and adjacent said diverter to provide an intermediate support for said shaft, said intermediate support means being supported by said forward portion of said tube and being constructed to permit relative axial movement of said shaft with respect to that support means;

means adjacent said other end of said shaft to move said shaft longitudinally for axial movement of said diverter relative to said flared open end of said tube; and metal bosses mounted on said outer margin of said frustoconical surface facing said flared open end of said tube to limit the rearward axial movement of said diverter by said shaft-moving means to prevent closing of said annular space, said diverter comprising:

a conical metal sheet on the rear surface of which said bosses are mounted;

gussets connected to said shaft and to said conical sheet to connect said sheet to said shaft; and a cast refractory secured to the entire forward face of said conical metal sheet, said refractory having a dished front face.

8. A thermal reactor for the oxidation by air of a part of the H$_2$S content of the acid gas to SO$_2$ which comprises:

a housing providing a combustion chamber and having an opening in a wall;

means to supply air through the opening to the chamber, said means including an air-supply tube having a forward cylindrical portion extending horizontally to said opening and said means being constructed so that air moving through the forward portion of said air-supply tube will flow in a generally linear manner parallel to the longitudinal axis of the forward portion of that tube; and a burner for feeding said acid gas through said opening in said housing to said combustion chamber, said burner including:

a gas-feeding tube having a forward cylindrical portion within, coaxial with and spaced from said forward portion of said air-supply tube and extending forwardly of said air-supply tube into said housing, said forward portion of said gas-feeding tube at its open end being flared;

a gas diverter concentrically disposed in that open end to provide an annular space between said diverter and said open end of said gas-feeding tube, said diverter having a rearward portion with a frustoconical surface having its outer margin facing the inner surface of that flared end of said gas-feeding tube at the annular space for diverging forward outflow of acid gas from the gas-feeding tube;

a shaft connected to the rear end of said diverter and extending rearwardly through the gas-feeding tube to an external location for the other end of said shaft, said shaft being concentrically disposed with respect to the forward portion of said gas-feeding tube;

means adjacent said other end of said shaft to support said shaft;

means within the forward portion of said gas-feeding tube and adjacent said diverter to provide an intermediate support for said shaft, said intermediate support means being supported by said forward portion of said gas-feeding tube and being constructed to permit relative movement of said shaft with respect to said support means;

means mounted on said gas-feeding tube and operatively associated with said shaft adjacent said other end of said shaft to move and position said shaft along its longitudinal axis for adjustment of the width of the annular space between said diverter and said flared open end of said gas-feeding tube; and means mounted on said burner to limit rearward axial movement of said diverter by said shaft to prevent closing of said annular space.

9. The thermal reactor of claim 8 wherein:

said diverter has bosses on said outer margin of said frustoconical surface facing said open end of said gas-feeding tube to constitute said means to limit the rearward axial movement of said diverter; and said diverter is a one-piece member of silicon nitride-bonded silicon carbide refractory and has a rearward threaded cylindrical extension from said portion having said frustoconical surface, said burner further including means to couple said extension of said diverter to the forward end of said shaft.

* * * * *

UNITED STATES PATENT OFFICE
CERTIFICATE OF CORRECTION

Patent No. 3,782,884         Dated January 1, 1974

Inventor(s) Willis L. Shumaker

It is certified that error appears in the above-identified patent and that said Letters Patent are hereby corrected as shown below:

Column 1, line 57, "the end" should read --that end--.
Column 2, line 8, "throughout" should read --throughput--.
Column 3, line 55, "and" should read --end--.

Signed and sealed this 16th day of April 1974.

(SEAL)
Attest:

EDWARD M.FLETCHER,JR.            C. MARSHALL DANN
Attesting Officer                Commissioner of Patents